(No Model.)
J. R. GATHRIGHT.
LOCOMOTIVE STREET CAR.
No. 421,829. Patented Feb. 18, 1890.
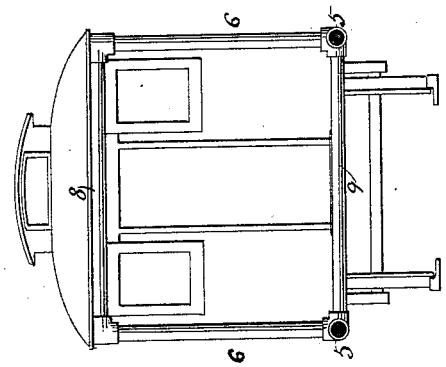
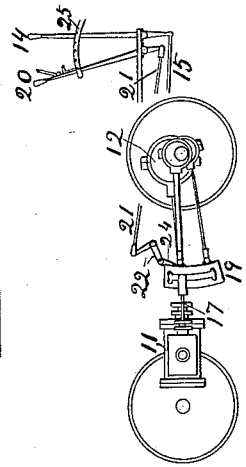
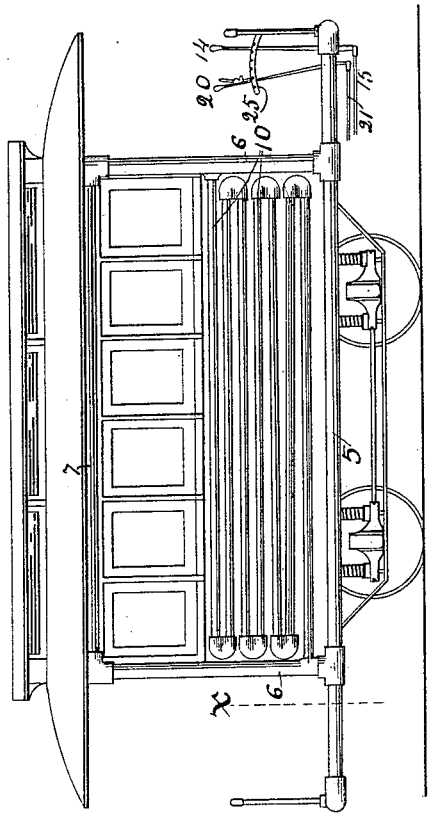
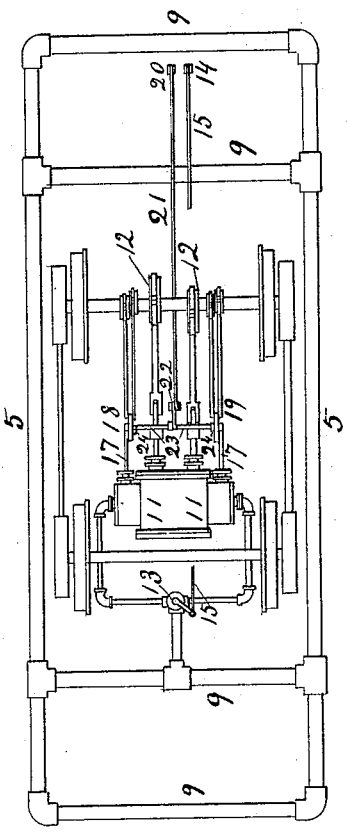
WITNESSES
S. E. E. Stevens.
P. E. Stevens.
INVENTOR
John R. Gathright.
H. X. Stevens.
Attorney

UNITED STATES PATENT OFFICE.

JOHN R. GATHRIGHT, OF LOUISVILLE, KENTUCKY, ASSIGNOR OF TWO-THIRDS TO WILLIAM JARVIS AND J. B. GATHRIGHT, OF SAME PLACE.

LOCOMOTIVE STREET-CAR.

SPECIFICATION forming part of Letters Patent No. 421,829, dated February 18, 1890.

Application filed December 4, 1889. Serial No. 332,490. (No model.)

*To all whom it may concern:*

Be it known that I, JOHN R. GATHRIGHT, a citizen of the United States, residing at Louisville, in the county of Jefferson and State of Kentucky, have invented certain new and useful Improvements in Locomotive Street-Cars; and I do hereby declare the following to be a full, clear, and exact description of the invention, such as will enable others skilled in the art to which it appertains to make and use the same.

This invention relates to self-propelling street-cars and other carriages; and its object is to provide means for storing compressed air, or any gas which may be similarly used, with the greatest economy as to space and facility of application.

To this end my invention consists in the construction and combination of parts forming a "locomotive street-car," hereinafter described and claimed, reference being had to the accompanying drawings, in which—

Figure I is a side view of a street-car with the frame-work partly exposed, showing part of my invention. Fig. II is an under side view of the same car, showing the arrangement of the locomotive-engines. Fig. III represents a cross-section at line *x*, looking toward the car-body. Fig. IV is a side view of the working parts of one engine, the other being similar.

5 represents the side sills of the car, 6 the corner-posts, 7 the upper longitudinal beams, 8 the upper cross-beams, and 9 the cross-sills, all of which are made of light strong tubing secured tightly together at every joint and communicating together to form a single reservoir in which I propose to store compressed air for running the engines of the car. This reservoir of connected pipes forms the actual frame-work of the car, thus distributing the iron of the reservoir, which is usually a dead-weight, to serve a second purpose of great value as an extremely strong car-frame. Should greater storage capacity be desired, the pipes of the reservoir may be further extended to form the frame-work 10 of the side casing of the car, and similar pipes may also extend to form the top and floor frames. This utilizing the car-frame as a reservoir to contain compressed air or other gas which might drive an engine is a principal characteristic of this invention.

I locate the engine-cylinders 11 underneath the car-floor and connect both directly with one of the car-axles by means of eccentrics 12 and rods 16, whereby the engines revolve the axle. The same throttle-valve 13 controls the supply of air to both engines 11, and that valve is connected with a hand-lever 14 by means of a rod 15. The slide-valve of one engine is connected by its rod 17 with link-gear 18 and of the other with link-gear 19, and both links are so timed to the movements of their respective gear and valves that a single reversing-lever 20 operates both at one and the same movement to produce a given effect, each on its own engine alike.

21 is rod connecting lever 20 with a bell-crank lever 22, which is provided with lateral arms 23, which are connected by rods 24 with the links, respectively.

It is a fact well known to engineers that the link-motion, provided with its variously-notched sector 25 to retain the reversing-lever at various degrees of advancement, from the turning-point to its extreme reach, serves as a cut-off action upon the slide-valve. Now by taking advantage of this fact I provide the engineer with means, first, for setting the slide-valves with a quick cut-off, so as to permit the air to act expansively when there is strong pressure of air in the reservoir, and when the air-pressure becomes less he may give a longer cut-off, and when the pressure becomes low he may allow full slide to the valves. This tends to prevent "wire-drawing," as it is termed, by permitting the throttle-valve to have a fair opening, even though the air is under pressure; second, it affords a very great effectual aid to the common brake, or it may be even substituted therefor. Under the moderate speed permitted by law on streets it is safe and easy for the engineer to turn down the throttle-valve until the air is almost shut off from the engines and then reverse the engines while in motion. A little experience with loads and grades would soon enable the engineer to bring the car to a quick halt with an effect as cushion-like as the best air-brakes produce. Without parting the frame these tubes may be shut up at any convenient point to make two or more reservoirs, so that one may be held in reserve under high pressure for ascending grades.

Having thus fully described my invention, what I believe to be new, and desire to secure by Letters Patent, is the following:

1. The combination, in a car-body, of the longitudinal sills 5, the cross-sills 9, connecting them, the longitudinal beams 7, the cross-beams 8, connecting the latter, and the vertical corner-posts 6, connecting the said beams and sills, all being tubes communicating together and forming a compressed-air reservoir, substantially as shown and described.

2. The combination of the tubular car-frame pipes 5, 6, 7, 8, and 9, arranged as described, and the frame-work pipes 10 in the casing of the car.

3. The combination of a car-frame comprising a series of tubes joined and forming a compressed-air reservoir, the engine-cylinders 11, communicating therewith, the eccentrics 12 on one of the car-wheel's axles, the rods 16, connecting the said eccentrics with the pistons of the said engines, the hand-lever 14 upon the engineer's platform, the throttle-valve 13 in the pipe leading to both engines, the rod 15, connecting the said lever 14 and valve 13, the hand-lever 20, and the reversing-gear described connected therewith by the rod 21, all as and for the purpose specified.

In testimony whereof I affix my signature in presence of two witnesses.

JOHN R. GATHRIGHT.

Witnesses:
WILLIAM JARVIS,
ERNEST MACPHERSON.